B. E. PINNELL.
LUBRICATOR.
APPLICATION FILED APR. 7, 1908.
903,766.
Patented Nov. 10, 1908.
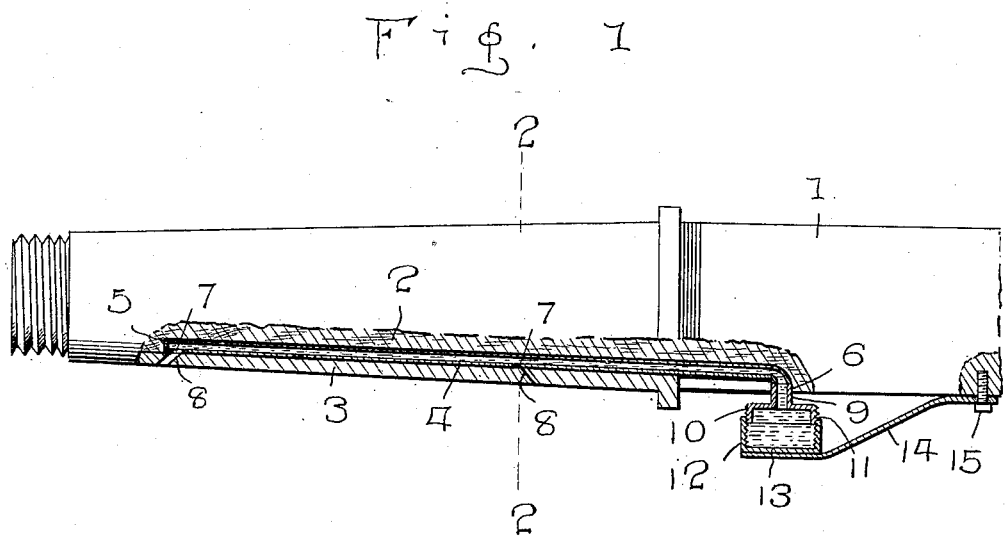
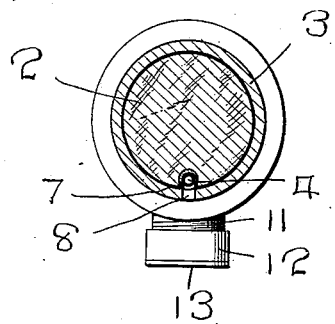
WITNESSES:
INVENTOR
B. E. Pinnell
BY
W. J. FitzGerald
Attorneys

UNITED STATES PATENT OFFICE.

BLEDSOE E. PINNELL, OF PROSPECT, KENTUCKY.

LUBRICATOR.

No. 903,766.  Specification of Letters Patent.  Patented Nov. 10, 1908.

Application filed April 7, 1908. Serial No. 425,628.

*To all whom it may concern:*

Be it known that I, BLEDSOE E. PINNELL, a citizen of the United States, residing at Prospect, in the county of Jefferson and State of Kentucky, have invented certain new and useful Improvements in Lubricators; and I do hereby declare the following to be a full, clear, and exact description of the invention, such as will enable others skilled in the art to which it appertains to make and use the same.

This invention relates to new and useful improvements in lubricators and has relation more particularly to devices of this character intended for lubricating vehicle axles.

It is an object of the invention to provide a novel device of this character, wherein the lubricant is fed at the base of the axle and at or adjacent the opposite ends of the spindles thereof.

It is also an object of the invention to provide a novel device of this character, wherein a movement of a portion of the lubricant receptacle, forces lubricant between the spindle and the hub of a wheel applied thereto.

It is also an object of the invention to provide a novel device of this character, wherein the lubricant receptacle or reservoir is detachably held by the axle in applied position.

It is also an object of the invention to provide a novel device of this character, which will be simple in construction, efficient and advantageous in practice and comparatively inexpensive to manufacture.

With the above and other objects in view, the invention consists in the details of construction and in the novel arrangement and combination of parts to be hereinafter more particularly referred to.

In describing the invention in detail, reference will be had to the accompanying drawings forming part of this specification, wherein like characters of reference denote corresponding parts in the several views, and in which, Figure 1 is a view partly in elevation and partly in section of a fragment of an axle, showing the invention applied thereto. Fig. 2 is a sectional view taken on line 2—2, Fig. 1.

In the drawings, 1 denotes an axle, which may be of any ordinary or preferred construction, terminating in a spindle portion 2, to which is secured a skein 3, as is well-known. The under portion of the spindle 2 and a portion of the axle 1 is grooved to receive the pipe 4 having its outer end 5 closed, while the inner end is in communication with an opening 6. This pipe 4, adjacent its closed end and at a point intermediate the center of the spindle and the rear thereof, is provided with perforations 7. These openings register with openings 8 in the skein, so that any lubricant forced through the pipe will be discharged through the registering openings 7 and 8.

It is essential that the pipe 4 be positioned beneath the axle 1 or spindle 2 thereof, as by this provision the lubricant discharged through the registering openings 7 and 8 will contact with the inner face of the hub, as the inner face of the hub is constantly in contact with the under surface of the spindle, as is believed to be apparent.

Extending within the opening 6 and registering with the open end of the pipe 4, is a nipple 9 carried by a section 10 of the lubricant receptacle or reservoir. This section 10 is provided at its edges with an annular depending flange 11 having its outer face screw-threaded. The threads of the flange 11 are engaged by the threads on the inner face of the flange 12 carried by a second section 13. The lubricant is placed between the sections 10 and 13, and when it is desired to discharge the lubricant through the openings 8, it is only necessary that the section 13 be turned about the section 10. It might be well to state at this point that this invention is intended to be employed with lubricating grease.

In order to hold the lubricant receptacle in position, a flat-spring 14 is secured at one end by a fastening means 15 to the under surface of the axle and the free portion of the spring bears against the under surface of the section 13. It might also be well to state that in practical operation, the lubricant receptacle or reservoir is much larger than is indicated in the drawings and that in the initial operation of the device, it will be necessary to so operate the movable member of the reservoir as to fill the pipe 4, but after this initial operation, it will only be necessary to give the movable member of the lubricant receptacle a slight rotation.

It is to be observed that the openings 8 are arranged on converging planes one with relation to the other and that the outer opening is of greater diameter than the inner opening. This, in the practical operation of the device has proven most advantageous.

It might also be well to state that in case the spindle should be too small to permit the pipe being employed, a hole could be drilled longitudinally through the spindle and tapped with openings for the lubricant to pass, which will, it is thought, be obvious.

I claim:

In combination with an axle and its spindle, of a delivering pipe extending along the spindle, a reservoir positioned beneath the axle, said reservoir having a nipple in communication with the pipe and having a rotatable cap and a spring secured at one end to the axle, the opposite end portion of the spring frictionally engaging the reservoir to hold the reservoir in an applied position and to hold the cap against rotation.

In testimony whereof I have signed my name to this specification in the presence of two subscribing witnesses.

BLEDSOE E. PINNELL.

Witnesses:
 JOE H. HARDIN,
 F. M. HOAGLAND.